INVENTORS
RUDY U. BIOLETTI
RICHARD M. KREHELY
ATTORNEY

INVENTORS
RUDY U. BIOLETTI
RICHARD M. KREHELY
BY [signature]
ATTORNEY

United States Patent Office 3,494,256
Patented Feb. 10, 1970

3,494,256
DUAL REDUNDANT ELECTROHYDRAULIC SERVO SYSTEM
Rudy Bioletti, Union City, and Richard M. Krehely, Palisade, N.J., assignors to The Bendix Corporation, a corporation of Delaware
Filed July 1, 1968, Ser. No. 741,557
Int. Cl. F01b *1/00;* F15b *9/09, 9/03*
U.S. Cl. 91—170                                       5 Claims

ABSTRACT OF THE DISCLOSURE

A dual redundant electrohydraulic servo system includes self-monitored primary and utility servos and a hydraulic locking device for coupling the respective servo rams to each other. An output corresponding to the difference between actual and commanded primary servo ram position is provided and when the difference output exceeds a preset level indicative of a primary servo failure the primary servo is hydraulically disengaged grounding the primary ram. The hydraulic lock couples the utility and primary rams so that the load is driven by the utility ram through the primary ram for fail operable performance. If both primary and utility servos fail, the primary ram is fixed to a neutral position forming a rigid ground point for load driving linkage whereby fail safe performance is provided.

BACKGROUND OF THE INVENTION

Field of the invention

This invention relates to dual redundant electrohydraulic servo systems and, more particularly, to systems of the type described which provide fail operable performance for failure of a primary servo system and fail safe performance for failure of the primary system and a utility system.

Description of the prior art

The dual redundant approach for electrohydraulic servos is necessary to meet increased reliability requirements for automatic flight control systems for high performance aircraft in order to provide the craft with low altitude, high speed flight capabilities.

Prior to the present invention there has been no effective device capable of monitoring the dual servo loops from input to output and resulting in servo disengagement regardless of which intermediate element in the loop failed. Moreover, it has not heretofore been possible to permit the servos to operate completely independent of each other allowing each to be monitored with no cross linking of individual servo ram errors.

SUMMARY OF THE INVENTION

This invention contemplates a dual redundant electrohydraulic servo system including two independent self-monitored servos and a hydraulic locking device for coupling each of the servo rams to the other. Each servo includes an electrohydraulic servo valve which ports flow through electrically activated by-pass and cut-off valves to the ram chamber providing ram motion. A signal corresponding to actual ram position is simultaneously fed back to the servo valve and to an error monitor. The error monitor provides a pressure output proportional to the difference between actual and commanded ram position, and when this difference exceeds a preset level, the error monitor allows pressure to act on the by-pass and cut-off valves to hydraulically disengage the servo. The by-pass and cut-off valves block hydraulic flow to the servo ram to disengage the servo. Disengagement of the primary servo causes the hydraulic lock to ground the primary ram and permits the utility ram to drive the load through the grounded primary ram for fail operable performance. If both primary and utility servo systems fail, or if a loss of function occurs as a result of electronic failures, or if the pilot elects to disengage the servo, the primary ram is fixed to a neutral position forming a rigid ground point for the aircraft linkage to provide fail safe performance.

One object of this invention is to provide a dual redundant electrohydraulic servo system which provides fail operable performance for failure of a primary servo and fail safe performance for failure of the primary servo and a utility servo.

Another object of this invention is to provide means for coupling the primary and utility servo rams so that if the primary servo fails the primary ram is rigidly fixed and motion of the utility ram is transmitted through said fixed primary ram.

Another object of this invention is to provide a dual redundant servo system of the type described having the capability of monitoring both servo loops from input to output and resulting in disengagement of the servo regardless of which element in the servo loops fails.

Another object of this invention is to provide means whereby both servo systems operate completely independent of each other allowing each to be monitored with no cross linking of individual servo ram errors.

Another object of this invention is to provide means functioning as a selector switch to allow servo position and force gain to remain unchanged regardless of which of the dual servo rams provides the servo output.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
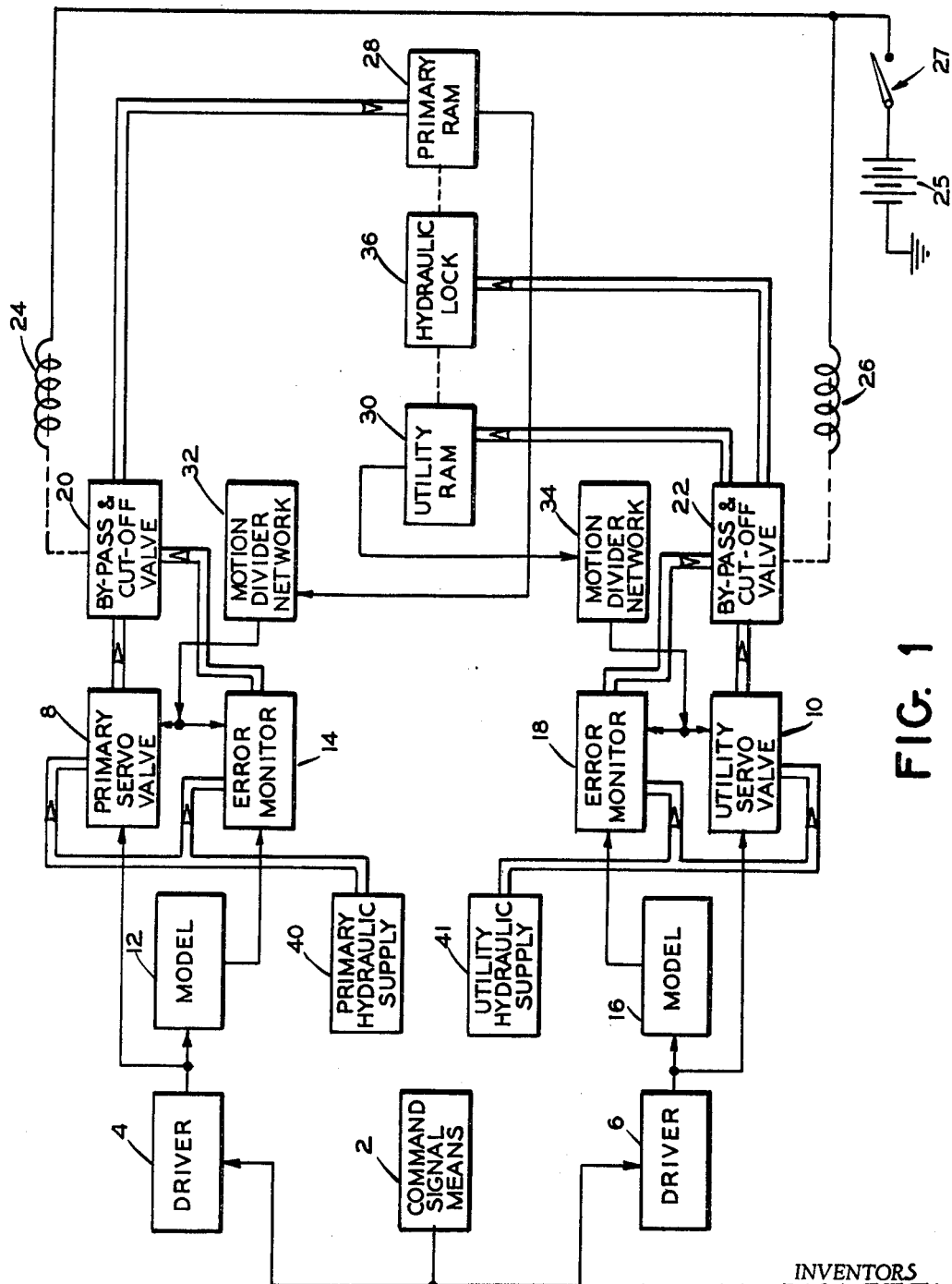
FIGURE 1 is a block diagram showing a dual redundant electrohydraulic servo system according to present invention.

With reference to FIGURE 1, a command signal means 2 provides a servo command signal, and which servo command signal is applied to a driver 4 in the primary servo chain and to a driver 6 in the secondary or utility servo chain. Drivers 4 and 6 amplify the signal from command signal means 2. The amplified signal from primary driver 4 is applied to a primary servo valve 8 and the amplified signal from utility driver 6 is applied to a utility servo valve 10.

The signal from primary driver 4 is applied to a model 12 and therefrom to an error monitor 14 and the signal from utility driver 6 is applied to a model 16 and therefrom to an error monitor 18. Models 12 and 16 provide lag characteristics commensurate with the time lag of the utility and primary servo rams, respectively.

Servo valves 8 and 10 port hydraulic flow commensurate with the signals from drivers 4 and 6 to a primary by-pass and cut-off valve 20 and to a utility by-pass and cut-off valve 22, respectively. By-pass and cut-off valves 20 and 22 are operated by solenoids 24 and 26, respectively, and which solenoids 24 and 26 are energized by a suitable source of direct current such as a battery 25 when a switch 27 is closed, to either permit or block flow to a primary servo ram 28 and to a utility ram 30 as will hereinafter be more fully explained.

Primary ram 28 is arranged to provide an electrical signal corresponding to the output of said primary ram, and which signal is fed back through a motion divider network 32 to primary servo valve 8 and to error monitor 14. Utility ram 30 similarly provides a signal corresponding to the output of utility ram 30, and which signal is fed back through a motion divider 34 to utility servo valve 10 and to error monitor 18. Servo valves 8 and 10 are driven in response to the difference between the servo command signal from command signal means 2 applied through drivers 4 and 6 and the feedback signals from servo rams 28 and 30, respectively.

The pressure output from error monitor 14 corresponds to the difference between the signal from driver 4 applied through model 12 and the signal from motion divider network 32, and the pressure output from error monitor 18 corresponds to the difference between the signal from driver 6 applied through model 16 and the signal from motion divider 34. When this difference exceeds a predetermined level, the pressure output from error monitors 14 and 18 actuates by-pass and cut-off valves 20 and 22 to block flow from primary hydraulic supply 40 and utility hydraulic supply 41 to the respective rams 28 and 30 and to block flow to a hydraulic lock 36 which couples primary ram 28 and utility ram 30 each to the other.

During the manual mode of operation or, in other words, when the servo system of the present system is disengaged and the aircraft is manually controlled, primary ram 28 is locked in a neutral position and provides a fixed reference point to the aircraft control linkage. Switch 27 is in open position and solenoids 24 and 26, which operate by-pass and cut-off valves 20 and 22, respectively, are de-energized. By-pass and cut-off valves 20 and 22 thus block hydraulic flow to rams 28 and 30 and to hydraulic lock 36.

When the servo system is operating normally, solenoids 24 and 26 are energized by battery 25 through switch 28 in closed position thereby actuating solenoids 24 and 26 which, in turn, permit hydraulic flow through by-pass and cut-off valves 20 and 22. Normally, primary ram 28 is driving the load and utility ram 30 is uncoupled from primary ram 28. No appreciable difference exists between the signals from motion divider network 32 and model 12 and from motion divider network 34 and model 16 and there is no pressure output from error monitors 14 and 18. In this connection it is to be noted that since there is no hydraulic flow through monitor 18 and hence no differential flow through valve 22, there is no pressure applied to hydraulic lock 36. Thus, rams 20 and 28 are uncoupled and are free to move independently of each other as a function of the command signal from command signal means 2.

If a failure occurs in the primary servo chain, for example, error monitor 14 senses the resulting difference between the signals from model 12 and motion divider network 32 and provides a pressure output for disengaging by-pass and cut-off valve 20 whereby hydraulic flow to primary ram 28 is blocked and primary ram 28 is fixed to a rigid ground position. Hydraulic lock 36 is actuated for coupling utility ram 30 to primary ram 28 as will be explained hereinafter with reference to FIGURE 2 and utility ram 30 so coupled to primary ram 28 thus drives the load through rigid primary ram 28. The same action will occur if there is a failure in the primary error monitor 14, a pressure failure in the primary system or an electrical failure of solenoid 24.

Failures in the utility servo chain similarly disengaged by-pass and cut-off valve 22. However in this event hydraulic lock 36 is not actuated and utility ram 30 and primary ram 28 are free to float.

If both primary and utility servo chains fail, or if there is an electrical failure, or if the pilot disengages the servo system by opening switch 27, hydraulic lock 36 fixes primary ram 28 to a neutral position forming a rigid reference for the aircraft linkage thus providing fail safe performance when loss of function occurs.

Figure 2:
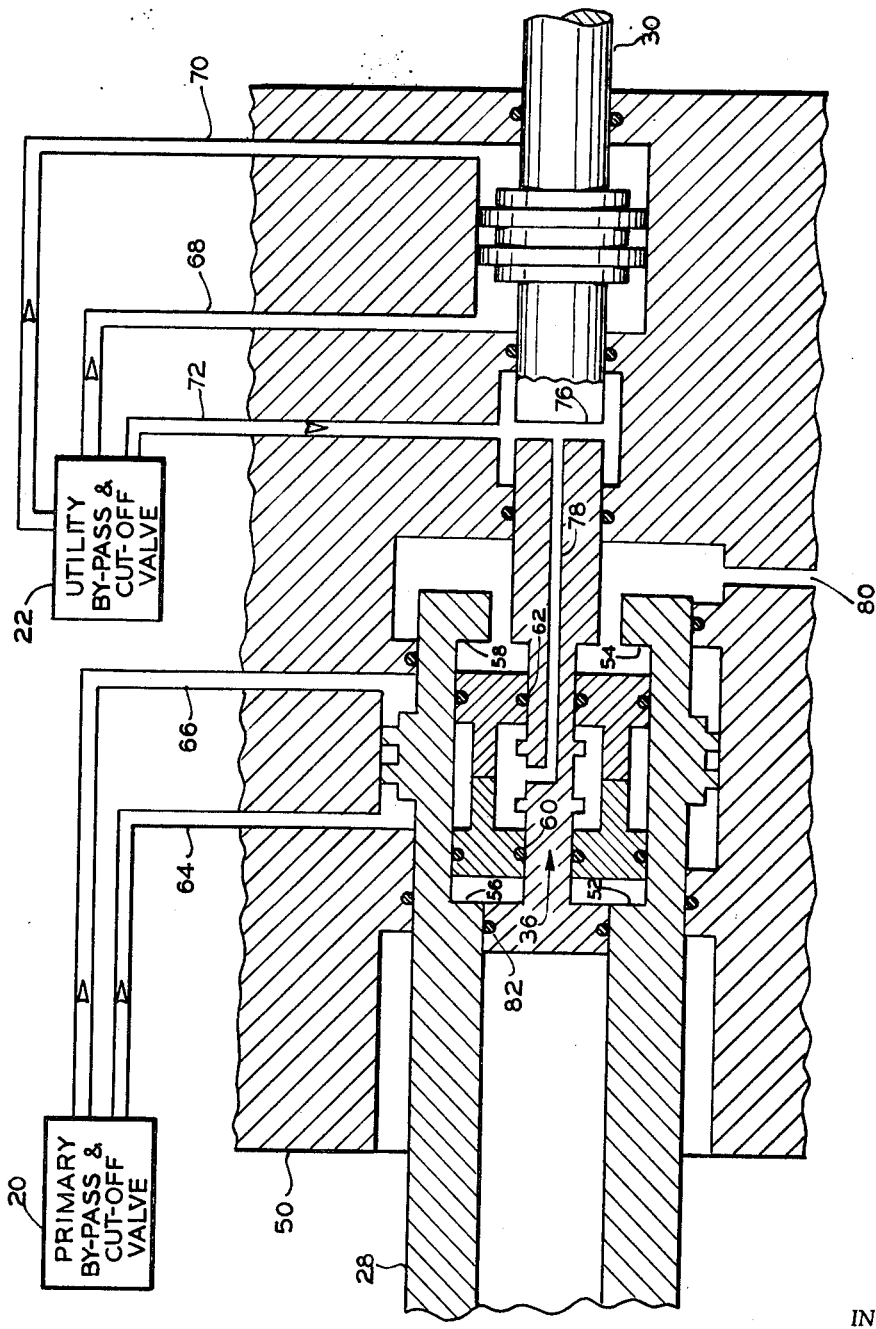
FIGURE 2 is a longitudinal section showing the utility and primary rams and the hydraulic locking device of the invention.

With reference to FIGURE 2 there is shown a housing 50 having suitably mounted therein primary ram 28 and utility ram 30 and which rams 28 and 30 are coupled each to the other by hydraulic lock 36 having glands 60 and 62. Primary by-pass and cut-off valve 20 is hydraulically connected by hydraulic ports 64 and 66 to primary servo ram 28 and utility by-pass and cut-off valve 22 is hydraulically connected to utility ram 30 by hydraulic ports 68 and 70 and is connected to hydraulic lock 36 through hydraulic ports 72, 76 and 78. The system is vented to the atmosphere by vent 80 and is sealed at various points by seals such as the seal 82 to prevent hydraulic leakage.

In normal operation, since there is no hydraulic pressure applied through port 72 to hydraulic lock 36, glands 60 and 62 are in the position as shown in FIGURE 2.

When a failure occurs in the primary servo system, by-pass and cut-off valve 20 is disengaged, hydraulic ports 64 and 66 are interconnected and the primary servo chain is deactivated. Simultaneously, utility system pressure is applied through by-pass and cut-off valve 22 and through hydraulic ports 72, 76 and 78 to hydraulic lock 36. This pressure drives glands 60 and 62 apart and against stages 52 and 54 on the inside diameter of primary servo ram 28 and against stops 56 and 58 on the outside diameter of utility servo ram 30. Thus, primary ram 28 and utility ram 30 are coupled together by the hydraulic fluid under pressure which maintains glands 60 and 62 against the aforementioned stops and utility ram 30 drives the load through primary ram 28. If the first failure occurs in the utility servo chain, utility ram 30 is deactivated in a manner similar to that explained with reference to the primary servo chain with hydraulic ports 68 and 70 becoming interconnected and primary ram 28 continuing to operate in the normal manner to drive the load. A failure now occurring in the primary servo chain deactivates the primary servo as heretofore explained.

OPERATION

During the manual mode of operations or when the servo system is disengaged by opening switch 27 to disengage by-pass and cut-off valves 22 and 24, primary ram 28 is locked in a neutral position and forms a rigid ground point for aircraft control linkage. Under these circumstances by-pass and cut-off valves 20 and 22 block hydraulic flow through ports 64, 66, 68, 70 and 72. Rams 28 and 30 are uncoupled from one another and each is free to move independently.

During normal servo system operation both primary and utility servos are engaged. This is accomplished by closing switch 27 whereupon solenoids 24 and 26 are energized by battery 25. By-pass and cut-off valves 20 and 22 are engaged and primary servo ram 28 which is the direct servo output link is driving the load. Utility servo ram 30 is tracking the commanded inputs since utility servo ram 30 is uncoupled from primary ram 28.

Failure in the primary servo system results in disengaging primary by-pass and cut-off valve 20 whereby the primary system piston is ported to drain. Simultaneously primary hydraulic pressure is removed from hydraulic lock 36 to permit utility system pressure to drive locking glands 60 and 62 against stops 52 and 54 and against stops 56 and 58, thus fixing the mid point of the ram coupling to ground so that utility ram 30 drives the load through primary ram 28. A pressure failure in the primary servo chain or an electrical failure of solenoid 26 will cause primary by-pass and cut-off valve 20 to go to its disengage position resulting in the same switching action as previously described for a servo valve or error monitor failure. Fail operable performance for a single failure in the dual servo system is thus provided.

If the failure is in the utility servo chain, primary ram 28 continues to drive the load, and utility ram 30 and hydraulic lock 36 are free to float. If both servo chains fail, or loss of function occurs as the result of electronic failures, or if the pilot elects to disengage the servo system by opening switch 27, primary system ram 28 is fixed in a neutral position forming a rigid ground point for the aircraft linkage thus achieving fail safe operation for loss of function.

The novel features of the device of the present invention are contained in the arrangement of error monitors 14 and 18 and hydraulic lock 36. Error monitors 14 and 18 are capable of monitoring the complete loop from input to output and will result in servo disengagement regardless of which intermediate element causes the failure. The use of hydraulic lock 36 permits the primary and utility servo chains to operate completely independent of each other allowing each to be monitored with no cross linking of individual ram errors. Since hydraulic lock 36 acts as a selector switch it allows the servo position and force gain to remain unchanged regardless of which ram drives the servo output.

What is claimed is:
1. A servo system for driving a load, comprising:
   first and second servo rams;
   means for providing a ram command signal;
   first means for providing a signal corresponding to the displacement of the first ram;
   second means for providing a signal corresponding to the dispacement of the second ram;
   a first valve connected to the command signal means, the first means and the first ram for providing flow of hydraulic fluid from a supply to displace the first ram in accordance with the difference between the command signal and the displacement signal from the first means;
   a second valve connected to the command signal means, the second means and the second ram for providing flow of the hydraulic fluid from the supply to displace the second ram in accordance with the difference between the command signal and the displacement signal from the second means;
   first control means connected to the command signal means, the first means and the first valve for blocking flow of hydraulic fluid when the difference between the signals from the command means and the first means exceeds a predetermined level;
   second control means connected to the command signal means, the second means and the second valve for blocking flow of hydraulic fluid when the difference between the signals from the command means and the second means exceeds a predetermined level; and
   means for coupling the first and second rams and for rendering the first ram effective to drive the load when the second control means blocks hydraulic flow, for grounding the first ram to a fixed reference and for rendering the second ram effective to drive the load through the fixed first ram when the first control means blocks hydraulic flow, and for rendering the first and second rams ineffective to drive the load when both the first and second control means blocks hydraulic flow.

2. A servo system as described by claim 1, wherein the first control means includes:
   a monitor connected to the command signal means, the first means and the hydraulic fluid supply for providing flow of hydraulic fluid commensurate with the difference between the signals from the command means and the first means; and
   means connected to the monitor and to the first valve and responsive to the hydraulic flow from the monitor when the difference between the signals from the command means and the first means exceeds the predetermined level to block flow from the first valve.

3. A servo system as described by claim 1, wherein the second control means includes:
   a monitor connected to the command signal means, the second means and the hydraulic fluid supply for providing flow of hydraulic fluid commensurate with the difference between the signals from the command means and the second means; and
   means connected to the monitor and to the second valve and responsive to hydraulic flow from the monitor when the difference between the signals from the command means and the second means exceeds the predetermined level to block flow from the second valve.

4. A servo system as described by claim 2, including:
   means for connecting the monitor to the command signal means to apply to the command signal lag characteristics commensurate with the operating lag of the first ram.

5. A servo system as described by claim 3, including:
   means for connecting the monitor to the command signal means to apply to the command signal lag characteristics commensurate with the operating lag of the second ram.

References Cited

UNITED STATES PATENTS 3,190,185    7/1961    Rasmussen.
3,411,410    11/1968    Westbury et al.

PAUL E. MASLOUSKY, Primary Examiner

U.S. Cl. X.R.

91—363, 411, 437